United States Patent Office 3,728,318
Patented Apr. 17, 1973

3,728,318
SUSPENSION POLYMERIZATION OF UNIFORM POLYMER BEADS
Herman C. Hamann, Melrose Park, and David H. Clemens, Willow Grove, Pa., assignors to Rohm and Haas Company, Philadelphia, Pa.
No Drawing. Filed Mar. 4, 1971, Ser. No. 121,130
Int. Cl. C08f 1/11, 15/02, 15/04
U.S. Cl. 260—86.7    6 Claims

ABSTRACT OF THE DISCLOSURE

Uniform polymer beads are produced by a suspension polymerization technique with the aid of a cationic dispersing or suspending agent in combination with a protective colloid, the polymerization being carried out with a basic pH. Polymer or copolymer beads which are uniformly sized and which represents a relatively narrow "cut" or range of a standard sieve classification are produced.

---

This invention relates to suspension (bead or pearl) polymerization under such conditions as to produce polymer beads which are surprisingly uniformly sized. The polymerization is carried out in the presence of a cationic dispersing or suspending agent and a suitable protective colloid. In addition, the pH during the polymerization must be carefully controlled so that it is on the basic side. Polymer beads having a relatively narrow size distribution are obtained, for example, with a high percentage of the beads being in the range of about −20+70 US.. standard sieve series.

The cationic dispersant or suspending agent which is used is a water-soluble, high molecular weight, linear polymer having a linear chain of repeating rings of quaternary ammonium salt groups. The cationic suspending or dispersing agent of choice is poly(diallyldimethyl-ammonium chloride) which is a known material and which can be produced according to the teachings of U.S. Pat. No. 3,288,770. Alternatively, one can use other linear high molecular weight water-soluble quaternary essentially linear ammonium chloride polymers which have an essentially linear homopolymeric molecular chain of repeating units of a formula selected from the group consisting of

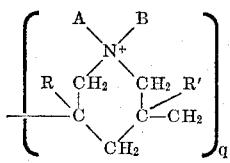

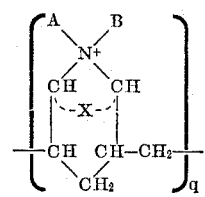

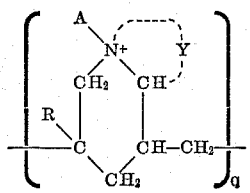

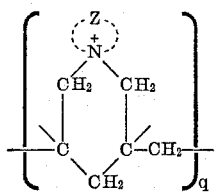

said polymer having an intrinsic viscosity in 0.1 N potassium chloride of at least between about 0.5 and 2.0 and wherein A and B independently represent a member selected from the class consisting of alkyl and phenyl radicals on which any substitutents are selected from the group consisting of hydroxy, amido, carboloweralkoxy, loweralkoxy, phenoxy, naphthoxy, cyano, thioloweralkoxy, thiophenoxy, loweralkoyl, 5- and 6-membered cycloalkyl, tri-(loweralkyl)ammoniumloweralkyl, with, on the alkyl groupings only, a nitro group, and, on the phenyl radicals only, a halogen atom; and, taken together, A and B represents a member selected from the group consisting of

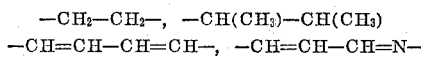
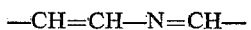

and

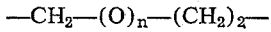

R and R' independently represent a member selected from the class consisting of hydrogen, chloro, bromo, loweralkyl, and phenyl radicals;
X represents a divalent radical of the formula $$-CH_2-(O)_n-(CH_2)_2-$$

symbol Y stands for a divalent radical of the formula:

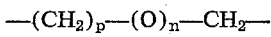

the symbol Z stands for a divalent radical of the formula:

and
$n$ is one of the numbers 0 and 1;
$m$ is one of the number 1 and 2;
$p$ is one of the numbers 2 and 3 and the symbol Q is an integer representing the number of units in the molecular chain.

It has been found that when the dispersing agent is used along with a gelatin type protective colloid that a water dispersible monomer mixture can be suspension polymerized to produce polymer beads which are highly uniform in their size and also substantially spherical. While the preferred protective colloid of choice is gelatin, and particularly a U.S.P. grade of gelating, other protective colloid materials such as polyalkylenepolyamine condensates with polyfunctional aliphatic compounds such as epichlorohydrin can also be used. These condensates have an average molecular weight of about 500 to 10,000, and more preferably about 600 to 3000. The condensates and their method of manufacture are disclosed in U.S. Pats. 2,765,228 and 2,765,229.

In addition to the combination of the dispersant and the protective colloid, is also important that the suspension polymerization be carried out on the basic pH side, with a pH in the range of about 9.5 to 11.5 being adequate. More preferably, the pH will be in the 10 to 10.5 range.

The monomers which are used in the present invention to produce the uniformly sized and uniformly spherical bead polymers of copolymers are addition-polymerizable monomers. They may be water-soluble or water-insoluble with the only important criteria being that they are at least water-dispersible. A preferred class of monomers are those that are useful in the manufacture of ion exchange resins, either directly, or as backbones for conversion to ion exchange resins. When the monomers are polymerized to produce ion exchange resins, the resins may be produced in the gel form in the macroreticular porous form. The monomers may be monoethylenically or polyethylenically unsaturated and, thus, they will contain at least one group of the formula $H_2C=C<$. Examples of such monomers include vinyl esters of ($C_1$-$C_{18}$) aliphatic acids such as vinyl acetate, laurate, and stearate; esters of acrylic acid or methacrylic acid with ($C_1$-$C_{18}$) alcohols, including ($C_1$-$C_{18}$) alkanols, benzyl alcohol, cyclohexyl alcohol, and isobornyl alcohol, such as butylacrylate or methacrylate, 2-ethylhexylacrylate or methacrylate, octadecylacrylate or methacrylate; a vinyl aromatic hydrocarbon such as, for example, styrene, vinyl toluene, isopropenyl toluene, and various dialkyl styrenes; acrylonitrile, methacrylonitrile, ethacrylonitrile and phenylacrylonitrile; acrylamide, methacrylamide, ethacrylamide N-methylol acrylamide, N-monoalkyl and -dialkyl acrylamide and methacrylamides, e.g.; N-monomethyl, -ethyl, -propyl, -butyl, and N-dimethyl, -ethyl, -propyl, -butyl, etc. alkacrylamides, e.g.; N-monophenyl and -diphenyl, -acrylamides and -methacrylamides; vinyl ethers, such as butyl vinyl ethers; N-vinyllactams such as N-vinylpyrrolidone; itaconic diesters containing a single $CH_2=C<$ grouping, e.g., dimethyl, diethyl, dipropyl, dibutyl and other saturated aliphatic monohydric alcohol diesters of itaconic acid, diphenyl itaconate, di-(phenylethyl) itaconate; allyl and methallyl esters of saturated aliphatic monocarboxylic acid, e.g., allyl and methallyl acetates, allyl and methallyl propionates, ally and methallyl valearates; vinyl thiophenes; various N-vinyl heterocyclics such as the 2-vinyl and 4-vinyl pyridines and alkylated vinyl pyridines, etc.

The concentrations of the cationic dispersant and the protective colloid can be varied over a reasonable range but generally, the most effective concentration range for the cationic dispersant is from about 0.1 to about 2% by weight based on the weight of the water phase and, more preferably, about 0.33% to about 0.67% by weight based on the weight of the water phase. The protective colloid can vary over a range from about 0.01% to about 1% by weight of the water phase and, more preferably, between about 0.08 and 0.46% by weight based on the weight of the water phase. As stated hereinabove, for the most effective gellation and most effective cooperation between the cationic dispersant and the protective colloid, it is important that the pH be maintained on the basic side. Preferably, the suspension polymerization is carried out while the pH is maintained in a range of about 9.5 to 11.5 and more preferably in a range of about 10 to 10.5.

Surprisingly, the cationic dispersant and protective colloid can be used to produce uniformly sized and uniformly spherical polymer beads of both the gel type and macroreticular or phase extended type. (The term "macroreticular" is well defined and described in the prior art, for example see British Pat. 935,125 and the tert entitled "Oxidation-Reduction Polymers" by Cassidy and Kun, 1956, Interscience Publication, New York, N.Y.)

In producing the uniformly sized and uniformly spherical polymers, copolymers and/or crosslinked interpolymers, the monomer mixtures are subjected to suspension polymerization in the presence of a suitable catalyst. The catalysts which form the free radicals necessary for the polymerization are conventional and are usually of the organic peroxide type. Typical examples include benzylperoxide, lauroylperoxide, t-butylperbenzoate, quinonehydroperoxide, azo-bis-isobutyronitrile, and the like. The polymerization is preferably carried out using a free radical catalyst; however, radiation induced polymerization can also be employed using such high energy radiation as X-rays or gamma-rays.

Polymerization times temperatures and pressures may vary considerably in accordance with techniques known to the art and depending on the monomer system used, type and concentration of catalyst. Polymerization may require from as little as a few minutes to several hours, suitable temperatures range from less than about 0° C. to more than 200° C., pressures from less than one atmosphere to several atmospheres. In a representative embodiment using a mixture of a water dispersible vinyl aromatic monomer such as styrene and a polyfunctional cross-linking agent such as divinylbenzene, the polymerization is effective by heating the mixture to a temperature in the range from about 60–90° C., in the presence of about one weight percent lauroylperoxide for about 10 hours.

The following examples are illustrative of the present invention. Throughout the specification all parts and percentages are by weight, and temperatures are in ° C., unless otherwise stated.

EXAMPLE 1

To a 1.5 liter resin flask equipped with a flat six-bladed stirrer with a crows-foot impeller at the bottom, a reflux condenser, two stainless steel baffles, a nitrogen inlet tube, and a thermocouple probe which is connected to a time-temperature profile controller is charged 477 grams of tap water, 3.2 grams of poly(diallyldimethyl-ammonium chloride), and 2.2 grams of a refined U.S.P. grade of gelatin. The pH of this solution is adjusted to 10.3 with 50% sodium hydroxide.

The organic portion of the charge is prepared separately by mixing 232.8 grams of styrene, 47.6 grams of divinylbenzene, and 210.8 grams of methylisobutylcarbinol (MIBC). 3.7 grams of benzoyl peroxide are then dissolved in the organic phase. The organic phase is then charged to the flask, and agitated at 250 r.p.m. for 2 minutes. The agitator is then shut off for 0.5 minute. The on-off procedure is repeated two more times before continuous agitation at 250 r.p.m. begun. A programmer controlled the heat-up cycle from room temperature to 80° C. over 1.75 hours. The batch is held at 80° C. for 10 hours, after which the condenser is rearranged for downward distillation, and the MIBC-water azeotrope removed (250–260 ml. of wet MIBC layer collected). The batch is then cooled, washed, filtered, and dried in a steam heated oven for 16 hours.

The dry beads (100%+1% conversion) are then sifted with 94.3% being collected in the −20+70 U.S. Standard Sieve Screen cut cut or size range. The effective size (E.S.) of the unsifted copolymer is 0.294, the harmonic mean size (HMS) is 0.392, and the uniformity coefficient (U.C.) 1.540.

EXAMPLE 2

Following the procedure of Example 1, 600 grams of tap water, 4.8 grams of poly(diallyldimethylammonium chloride) and 3.3 grams of gelatin, are charged to the resin kettle. The pH is adjusted to 10.3 with 50% NaOH. The organic phase, 231 grams of methyl acrylate and 16.0 grams of divinylbenzene are mixed and catalyzed with 2.25 grams of lauroyl peroxide. Three 1.5 minute on, 0.5 minute off stirring cycles, at 250 r.p.m. are carried out prior to continuous agitation at 250 r.p.m. The batch is heated with stirring to 58–59° C. over a ½ hour period, held at 58–59° C. for 1.75 hours, then heated slowly to 66–68° C. at which point an exotherm occurs. The exotherm is controlled at 75° C. by the addition of ice water. After the exotherm subsides, the batch is heated to 90–95° C., and held at that temperature for 1.5 hours. The batch is then cooled, washed, filtered, and dried in a steam-heated oven for 16 hours. The dry beads (94.6% conversion) are then sifted with 87.3% being collected in the −20+70 U.S. Standard Sieve Screen cut or size. The effective size (E.S.) of the unsifted copolymer is 0.295, the harmonic means size (HMS) 0.400, and the uniformity coefficient (U.C.) is 1.580.

EXAMPLE 3

Following the procedure of Example 1, 477 grams of water, 3.2 grams of poly(diallyldimethylammonium chloride) and 2.2 grams of gelatin are charged to the resin flask. The pH is adjusted to 10.5 with 50% NaOH. The organic phase 129.0 grams of divinylbenzene and 297.0 grams of toluene are mixed and catalyzed with 1.3 grams of benzoyl peroxide. The time-temperature profile is the same as in Example 1, but the agitation rate is 300 r.p.m.

The toluene is removed by an azeotropic distillation like that used in Example 1 with 340–350 ml. of wet toluene being recovered. The batch is cooled, washed, filtered, and dried in a steam oven for 16 hours.

After drying, a conversion of 96% is realized with 90.4 percent of the beads falling in the —20+50 U.S. Standard screen cut. The E.S. of the unsifted copolymer was 0.429, the HMS 0.577, and the U.C. 1.582.

EXAMPLE 4

Following the procedure of Example 1, additional samples are prepared. The results are shown in the table below:

TABLE

| Sample No. | Dispersion system percent solids based on H₂O) | | Initial pH | Percent conversion | Percent product (mesh cut) on monomer | Unsifted product | | |
|---|---|---|---|---|---|---|---|---|
| | Cationic dispersant [2] | Protective colloid [1] | | | | E.S. | H.M.S. | U.C |
| A [3] | 0.67 | | 6.9 | Emulsion inverted-no product | | | | |
| B [4] | | 0.46 | 6.6 | Extensive break-up during heat-up | | | | |
| C [5] | 0.67 | 0.46 | 10.2 | 100.5 | 94.25 (—20+70) | 0.332 | 0.448 | 1.571 |
| D [6] | 0.67 | 0.46 | 10.4 | 98.9 | 93.4 (—20+70) | 0.250 | 0.337 | 1.532 |
| E [7] | 0.67 | 0.46 | 10.5 | 101.2 | 92.9 (—20+70) | 0.254 | 0.308 | 1.288 |
| F [8] | 0.67 | 0.46 | 10.7 | 105.5 | 96.8 (—20+70) | 0.341 | 0.472 | 1.621 |
| G [9] | 0.67 | | 10.3 | Clustered | | | | |
| H [10] | | 0.46 | 10.3 | Agglomerated | | | | |

[1] U.S.P. grade of gelatin.
[2] Poly (diallyldimethylammonium chloride).
[3] 6% DVB-styrene copolymer.
[4] 6% DVB-styrene copolymer.
[5] 20% DVB-styrene copolymer.
[6] 4.0% DVB-styrene copolymer.
[7] 4.0% DVB-styrene copolymer.
[8] 12.0% DVB-styrene copolymer.
[9] 6% DVB-styrene copolymer.
[10] 6% DVB-styrene copolymer.

NOTE.—E.S.=Effective size; H.M.S.=Harmonic mean size; U.C.=Uniformity coefficient.

We claim:

1. In the suspension polymerization of an addition-polymerizable, water-dispersible, monomer suspended in an aqueous medium, the improvement which comprises preparing uniformly sized and spherical beads by carrying out said polymerization at a pH in the range of about 9.5 to 11.5 in the presence of (1) a protective colloid which is present in an amount of about 0.01 to 1% by weight of the water phase and (2) a cationic dispersant which is present in an amount from about 0.1 to 2% by weight of the water phase, said cationic dispersant being a water-soluble, quaternary ammonium chloride high molecular weight linear polymer having a homopolymeric molecular chain of repeating units of a formula selected from the group consisting of

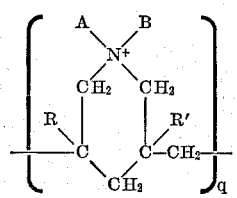

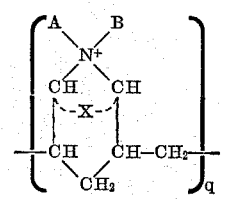

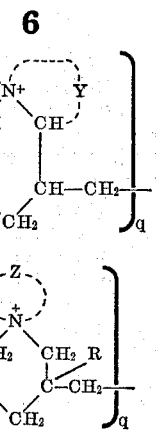

said polymer having an intrinsic viscosity in 0.1 N potassium chloride of at least between about 0.5 and 2.0, and wherein A and B independently represent a member selected from the class consisting of alkyl and phenyl radical on which any substituents are selected from the group consisting of hydroxy, amido, carboloweralkoxy, loweralkoxy, phenoxy, naphthoxy, cyano, thiolower-alkoxy, thiophenoxy, loweralkoyl, 5- and 6-membered cycloalkyl, tri-(loweralkyl)ammoniumloweralkyl, with, on the alkyl groupings only, a nitro group, and, on the phenyl radicals only, a halogen atom; and, taken together, A and B represents a member selected from the group consisting of

—CH₂—CH₂, —CH(CH₃)—CH(CH₃)

—CH=CH—CH=CH, —CH=CH—CH=N— and

—CH=CH—N=CH—

R and R' independently represent a member selected from the class consisting of hydrogen, chloro, bromo, lower alkyl, and phenyl radicals;

X represents a divalent radical of the formula

—CH₂—(O)$_m$—(CH₂)$_m$—

Y represents a divalent of the formula

—(CH₂)$_p$(O)$_n$—CH₂—

Z represents a divalent radical of the formula

—(CH₂)$_p$—(O)—(CH₂)₂— and $n$ is one of the numbers 0 and 1;
$m$ is one of the numbers 1 and 2;
$p$ is one of the numbers 2 and 3;
and the symbol Q is an integer representing the number of units in the molecular chain.

2. Process according to claim 1 wherein the cationic dispersant is a poly(diallyldimethylammonium salt).

3. Process according to claim 2 wherein the protective colloid is gelatin.

4. Process according to claim 2 wherein the protective colloid is a gelatin and the cationic dispersant is poly(diallyldimethylammonium chloride).

5. Process according to claim 4 wherein the polymerization is carried out to produce beads the majority of which are in the range of −20 to +70 U.S. Sieve size.

6. Process according to claim 4 wherein the cationic dispersant is present in an amount of from about 0.33% to about 0.67% by weight of the water phase, and the protective colloid is present in an amount of from about 0.08% to about 0.46% by weight based on the weight of the water phase.

References Cited
UNITED STATES PATENTS

| | | | |
|---|---|---|---|
| 2,982,749 | 5/1961 | Friedrich | 260—23 |
| 3,288,770 | 11/1966 | Butler | 260—88.3 |

JOSEPH L. SCHOFER, Primary Examiner

C. A. HENDERSON, JR., Assistant Examiner

U.S. Cl. X.R.

260—29.6, 78.4 A, 78.5 UA, 79.7, 80 M, 80.3 E, 80.3 N, 85.5 N, 85.7, 86.1, 88.2 C, 88.3 L